J. A. HAGERSTROM.
SPRING WHEEL.
APPLICATION FILED JULY 25, 1911.

1,120,142.

Patented Dec. 8, 1914.
5 SHEETS—SHEET 2.

Witnesses:
H. H. Knight
H. Alfred Jauke

Inventor
John A. Hagerstrom
By his Attorneys

J. A. HAGERSTROM.
SPRING WHEEL.
APPLICATION FILED JULY 25, 1911.

1,120,142.

Patented Dec. 8, 1914.
5 SHEETS—SHEET 3.

Witnesses:
H. H. Knight
H. Alfred Faulks

Inventor
John A. Hagerstrom
By his Attorneys

J. A. HAGERSTROM.
SPRING WHEEL.
APPLICATION FILED JULY 25, 1911.

1,120,142.

Patented Dec. 8, 1914.
5 SHEETS—SHEET 4.

Witnesses:

Inventor
John A. Hagerstrom
By his Attorneys

UNITED STATES PATENT OFFICE.

JOHN A. HAGERSTROM, OF BROOKLYN, NEW YORK.

SPRING-WHEEL.

1,120,142.   Specification of Letters Patent.   Patented Dec. 8, 1914.

Application filed July 25, 1911. Serial No. 640,390.

*To all whom it may concern:*

Be it known that I, JOHN A. HAGERSTROM, a citizen of the United States, and a resident of the borough of Brooklyn, county of Kings, and State of New York, have invented certain new and useful Improvements in Spring-Wheels, of which the following is a full and clear specification, illustrated in the accompanying drawings, the particular novel features being more particularly pointed out in the annexed claims.

My invention relates in general to so called spring wheels for vehicles, in particular, for power driven vehicles, in which yielding members aid in supporting the hub within the felly in order to absorb or lessen the shocks caused by the unevenness of the road before they reach the hub, and in particular permit doing away with pneumatic tires.

Another feature of my novel wheel is that by its construction the torque being transmitted from the axle to the felly through the yielding member, the sudden strain put onto the driving mechanism of the vehicle, in particular on the starting is considerably lessened.

In said drawings.

Figure 1:
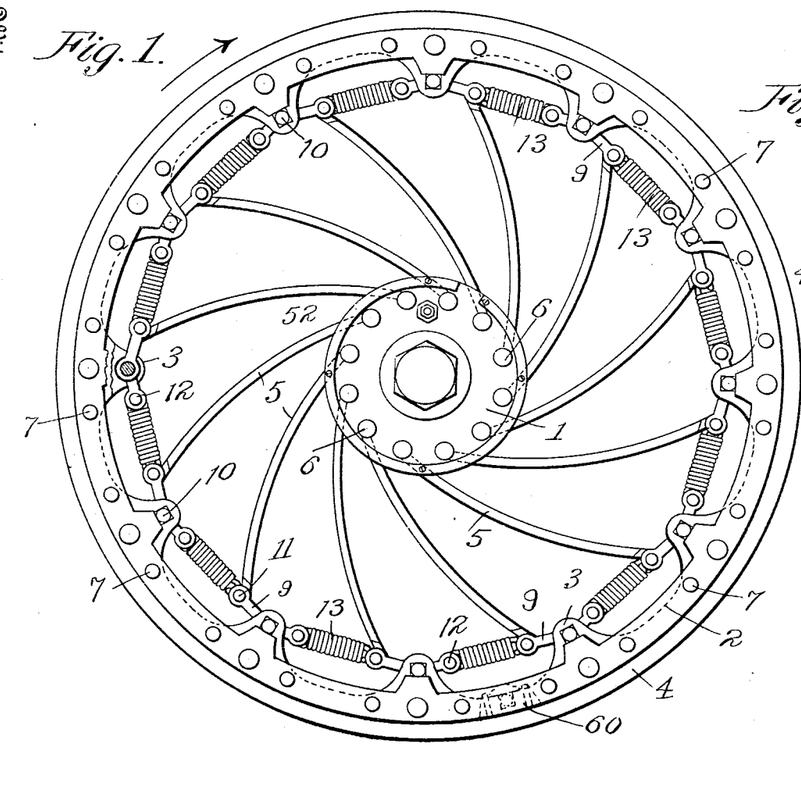
Figure 1 is a side elevation of the wheel.
Figure 2:
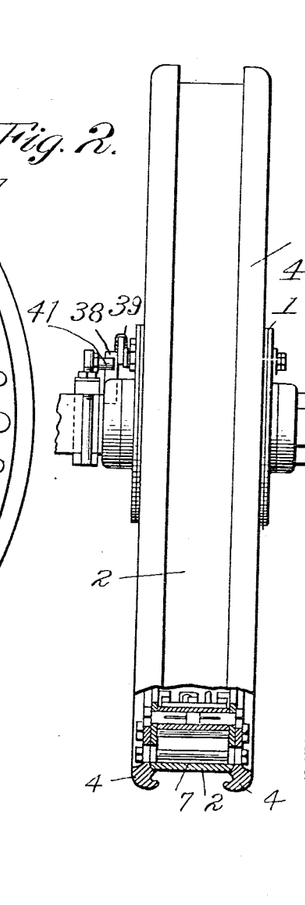
Fig. 2 is a front elevation thereof.

Referring to Fig. 1, the hub is designated at 1. 2 is the felly and 5 are the spokes pivotally attached at 6 to the hub and connected to the felly in the manner which will be described hereinafter. 4 are the rims which are intended to hold the tire (not shown and which may be of solid rubber or any other suitable material) on the wheel. The rims are attached by bolts 7, 7 to the felly as shown in Figs. 1 and 2. As shown for instance in Fig. 6, the spokes 5 are pivotally attached to the hub in the following manner: The main body of the hub is provided with two disks or flanges 8, 8, one at each end, in which are disposed bolts 6 serving as pivots for the spokes 5 as shown. The outer ends of spokes 5 are pivotally attached to double-armed rockers 9 which in turn are pivotally disposed in the felly 2 between ears 3 as shown in Figs. 1 and 2. The pivot pins for these rockers are indicated at 10 in these figures, and the rocker is shown in larger scale and pivotally attached to a spoke 5 in Figs. 8 and 9. The relative positions of all the rockers 9 and spokes 5 in the wheel are normally such that the rockers extend substantially concentrically with the felly while the arms extend substantially tangentially to the hub 1. The pivotal joints between the spokes and the rockers are indicated at 11 in Figs. 1, 8 and 9.

The free end 12 of each rocker is connected by two springs 13 with the pivotal joint 11 of the adjacent spoke and rocker toward which it points, which clearly appears from Fig. 1, so that by these springs all rockers are held yieldingly in position and form with their connecting springs a circle concentrical with the felly 2, whereby the spokes 5 are pivotally attached at equidistant points 11 to the periphery of this circle. By this arrangement the effect is obtained that if for instance the wheel is driven from the hub in the direction indicated by the arrow in Fig. 1, the tension springs 13 yieldingly resist the tendency of spokes 5 to rock the rockers 9 and thus they cushion the torque transmitted from the hub by the spokes and rockers to the felly. Moreover by this arrangement any shock which in turn the felly receives from the road is cushioned in similar manner and either entirely absorbed by the springs or lessened to such extent before it reaches the hub that its detrimental effect to the axle is entirely or substantially annihilated, and thus permits the use of solid rubber tires or even iron tires instead of the unreliable pneumatic tires.

Figures 8, 9, 10, 11, 15, 16, 17:
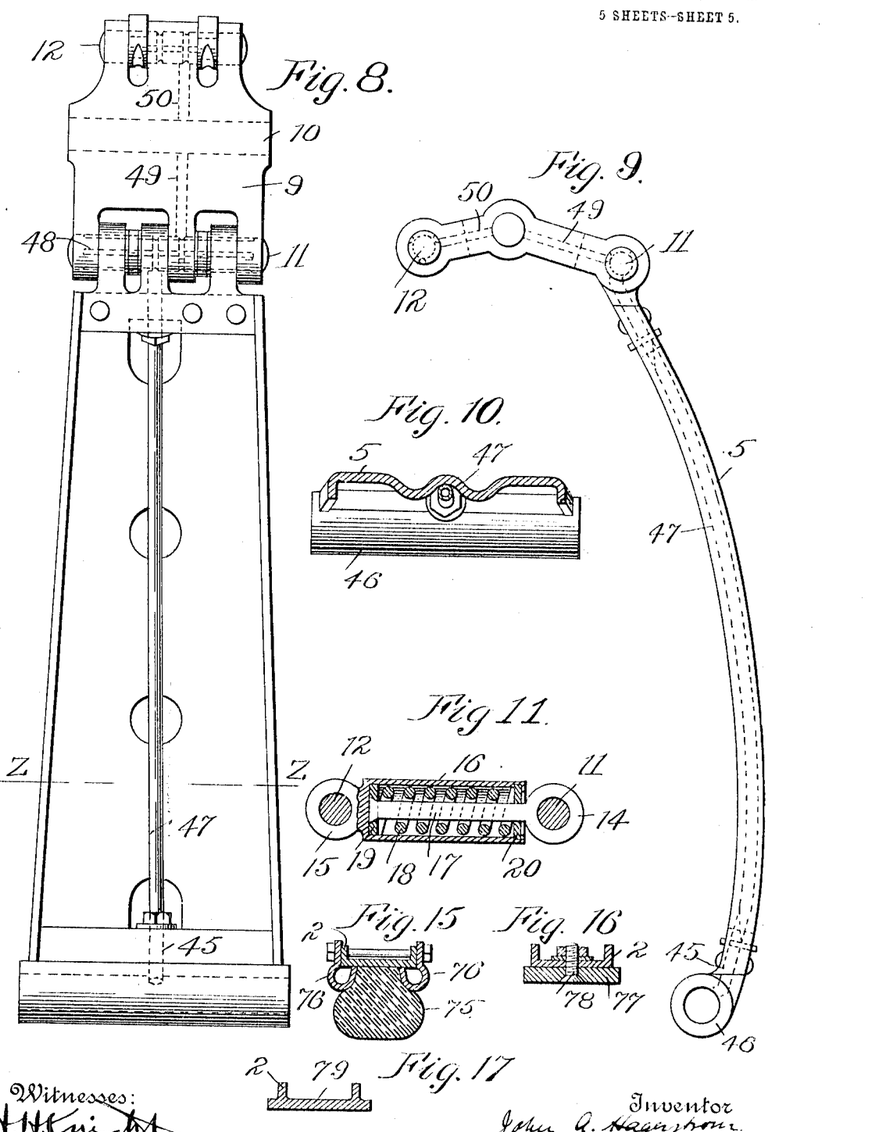
Fig. 8 is a broad side view of one of the spokes.
Fig. 9 is a side view of the spoke shown in Fig. 8 as it appears in the side view of the wheel in Fig. 1.
Fig. 10 is a cross sectional view of the spoke on the line *z—z* in Fig. 8.
Fig. 11 is a modified form of the spring members holding the spokes in place relatively to the felly.
Figs. 15, 16 and 17 are cross sections of the felly and tire attached to it, showing various kinds of tires and their manner of attachment.

Instead of using tension springs 13, I may also use compression springs with the same effect. Such compression springs 18 may be used for instance in the manner shown in Fig. 11. In this figure 11 and 12 represent the pivot pins to which in Fig. 1 springs 13 are attached, and in Fig. 11 to these pins are attached the eyes 14 and 15 respectively. Eye 14 forms the outer end of a rod 17, the inner end of which carries a disk 19 disposed in a cylinder 16 with which eye 15 is integral. The outer end of this cylinder is closed by a disk 20 which guides rod 17 in its central boring. Between disks 19 and 20 compression spring 18 is disposed which thus tends to hold pins 11 and 12 at their normal distance and to prevent their moving apart similarly to the action of tension springs 13 in Fig. 1.

The numerous pivotal joints of the spokes and rockers should be of course always kept lubricated to prevent wear under the constant strain to which they are subject. I obtain the lubrication of all these joints by the automatic oiling device which is set into operation as soon as the wheel commences to revolve and which I will now describe.

Figures 3, 4:
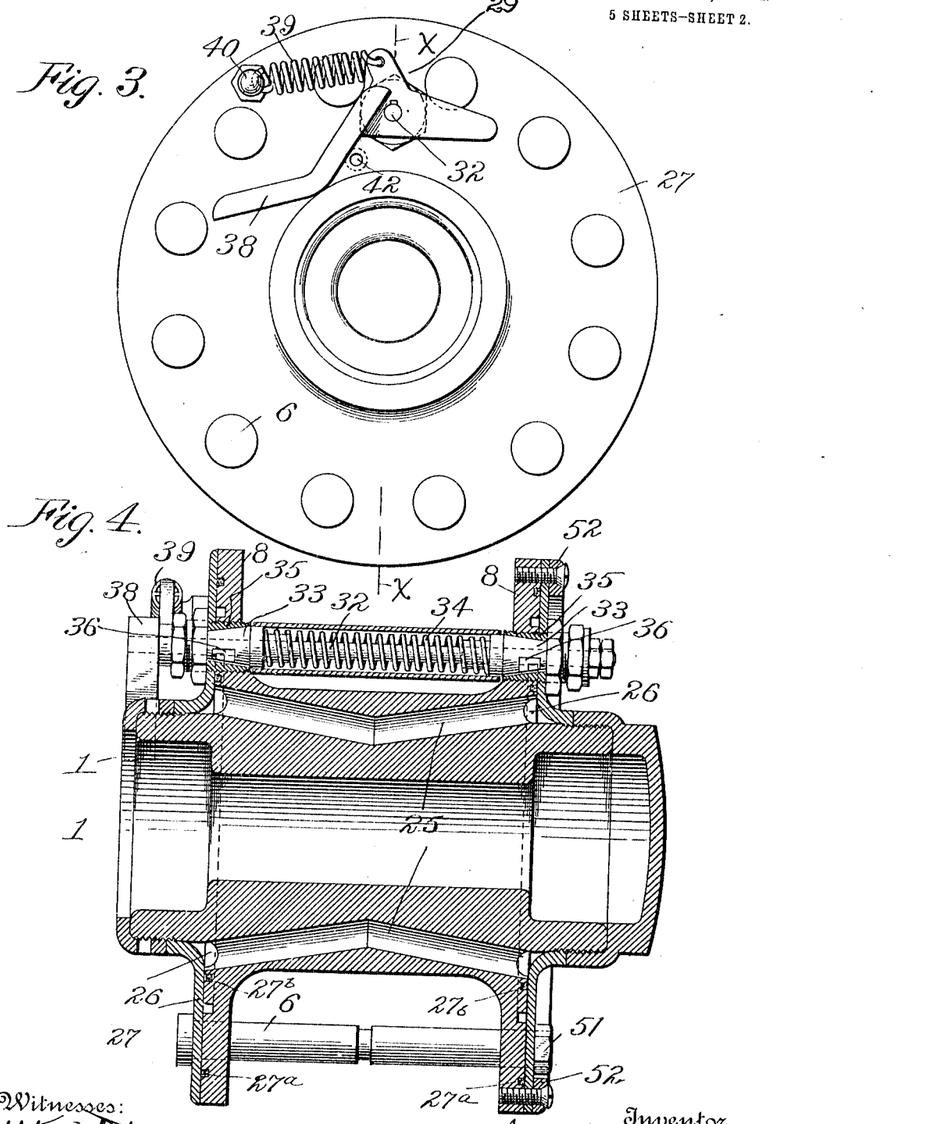
Fig. 3 is a side elevation of the hub end, facing the vehicle.
Fig. 4 is a longitudinal section through the hub on the line *x—x* in Fig. 3.
Figure 5:
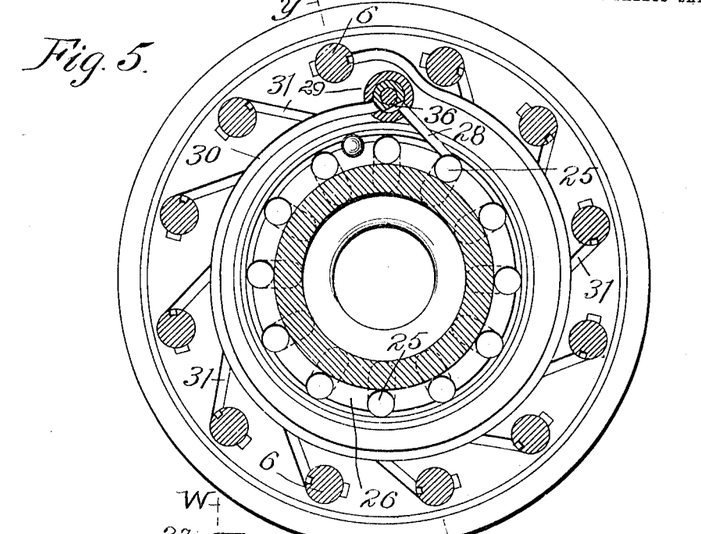
Fig. 5 is a view of the same hub end shown in Fig. 3, the covering plate being removed and seen on the section line W—W in Fig. 6.

In Fig. 4 which illustrates the hub 1 in longitudinal section, oil wells 25 will be noted, which are formed by a number of borings extending substantially longitudinally of the hub body and are arranged in a suitable number in a circle as may be seen from Fig. 5. I have shown these wells in Fig. 4 inclined toward the central hub axis which form I prefer. These wells terminate at both faces of the hub and communicate at such faces with each other by means of circular grooves 26, each of which is covered by an end plate or disk 27 provided at either end and covering the entire face of the hub. The pivotal bolts 6 carrying spokes 5 previously described extend through these end disks 27 and hold them tightly to the hub faces by means of their respective heads and nuts as will be clearly seen from Fig. 6. From one of the oil wells 25 as shown in Fig. 5 a channel 28 provided in the hub face, extends outwardly substantially tangentially and leads to the intermittently operated controller 29 which I shall describe presently. Previously it may be stated that from controller 29 a channel 30 extends spirally outwardly in one turn and terminates at one of the pivotal bolts 6 as shown in Fig. 5. Moreover a branch channel 31 extends from spiral channel 30 to each of the remaining bolts 5 as also appears from Fig. 5 and by this channel system oil may be conducted to these pivotal bolts in the manner to be described later on. The zone on the hub faces within which these channels are located is surrounded outside and inside by packing rings 27ª and 27ᵇ respectively which are tightened by disk 27. These packings may be seen in Figs. 4 and 5 and 6.

Figure 6:
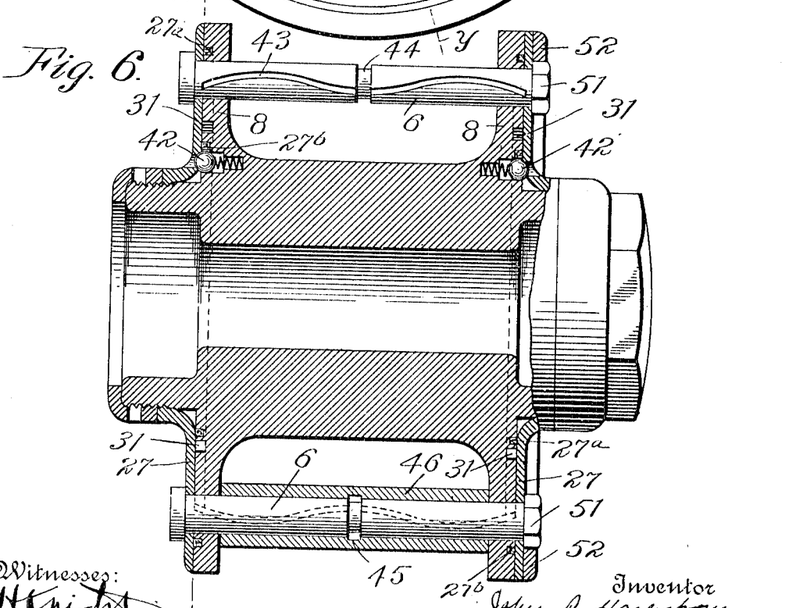
Fig. 6 is a longitudinal section through the hub on the line *y—y* in Fig. 5.

The oil controller is constructed and operated as follows: A small shaft 32 extends between hub disks 8, 8 as will be noted from Figs. 3 and 4 and this shaft has splined to it at the portion where it passes through each disk a cone 33 between which a compression spring 34 is arranged so that these cones are pressed outwardly into their seats 35 which are threaded into disks 8. Each of these cones is flattened at the point where its surface intersects with channels 28 and 30 as shown at 36 in Figs. 4 and 5, this flattened portion being of such size that it extends from channel 28 to channel 30 and thus establishes a communication therebetween when the shaft and its cones are rocked into the proper position. This is accomplished as follows: The end of rocking shaft 32 protruding through the hub disk 8 on the inner end of the hub (left hand end in Fig. 4) carries fixed to it a double faced latch 38 of the form shown in Figs. 3 and 4, which latch is held in the position shown in Fig. 3 by means of a spring 39 fastened at one end to a suitable detent of the latch and at the other end to a pin 40 fixed on disk 8. When the latch is in this position, the flattened portion 36 of each cone 35 faces channel 28 as shown in Fig. 5 so that communication between this channel and channel 30 is interrupted. Now adjacent to the inner end of the hub is fastened to the vehicle axle (not shown) and above it a pin 41 which when the hub revolves with the wheel lifts latch 38 once each revolution and thereby rocks shaft 32 and its cones 33 whereby their flattened portions 36 are turned so that they establish temporarily communication between channels 28 and 30, spring 39 returning them thereafter into their normal position shown in Fig. 5. When the hub revolves the centrifugal force tends to throw the oil contained in wells 25 into circular groove 26 and eventually into channel 28, a small portion of the oil squirting from this channel into channel 30 when the controller 29 establishes temporary communication between these channels in the manner just described. Oil may be supplied into the wells 25 through ball valves 42 shown in Fig. 6. Thus the oil gradually works its way through spiral groove 30 and into its side channels 31 where it reaches pivot pins 6 which are thoroughly lubricated thereby with the aid of longitudinal channels 43 provided on the surface of these pins as shown in Fig. 6. These pins are also provided midway between their ends with an annular groove 44 which registers with a radial boring 45 provided in the sleeve 46 of each spoke 5 so that the superfluous oil flows through this boring into a tube 47 threaded into this boring 45 as shown in Fig. 8. This tube leads the oil with the aid of centrifugal force to the pivotal joint 11 between the outer end of each spoke 5 and its rocker 9 where it is distributed in similar manner by grooves 48 shown in dotted lines in Fig. 8. The superfluous oil may then flow from this joint through boring 49 in rocker 9 into pivotal pin 10 to lubricate it and thence to pivotal pin 12 through boring 50, to which pin the springs 13 are attached. Thus automatically lubrication of all moving joints may be obtained while the wheel runs, whereas so long as the wheel stands still the oil is held in the wells 25 by controller 29.

Figures 7, 12, 13, 14:
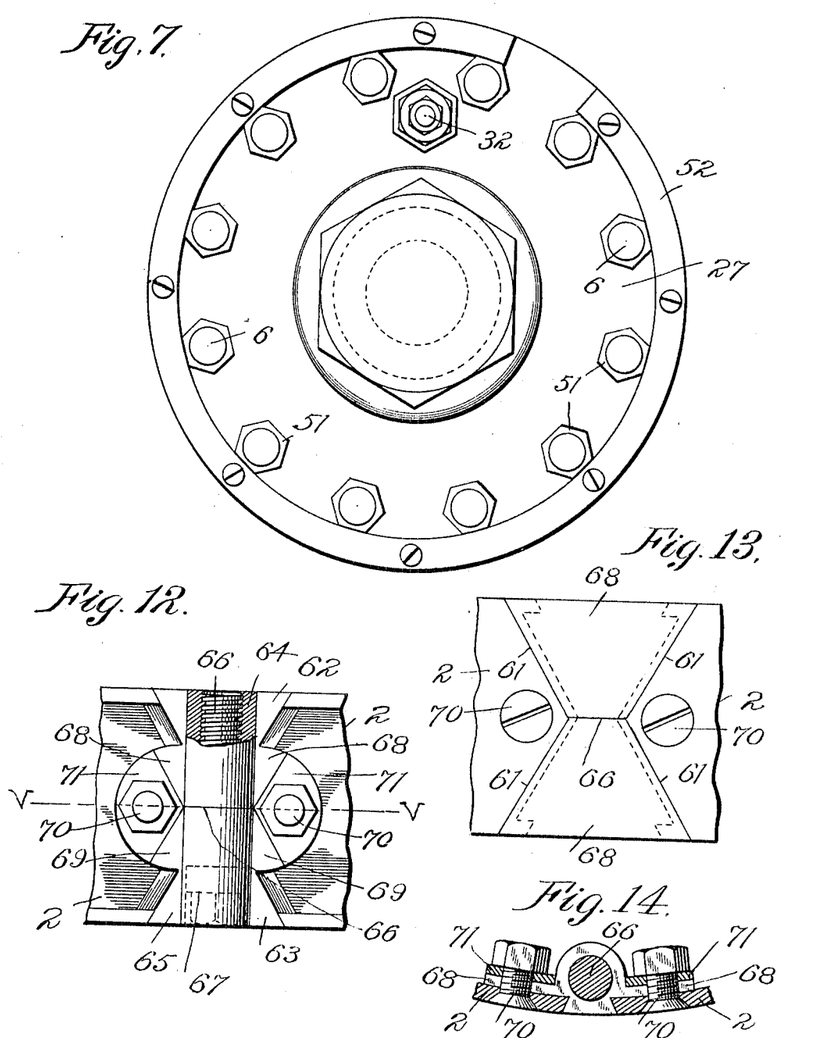
Fig. 7 is a side view of the outside hub end.
Fig. 12 is an inside view of a felly portion containing the expansion device.
Fig. 13 is an outside view thereof.
Fig. 14 is a sectional view of the expansion device shown in Fig. 12 taken on the line *v—v* in that figure.

To prevent the nuts 51 of pivotal bolts 6 shown in Fig. 7 in full view from accidentally loosening, I provide a ring 52 which touches one side of each nut and which is screwed to disk 8 as shown in Fig. 7.

As has been previously described, the rims 4 of the wheel are attached to the U-shaped felly 2 by means of screws 7, which are clearly illustrated in Fig. 1 and I have also illustrated for instance in Fig. 15, how a solid rubber tire 75 may be attached to the wheel by means of the lateral rims, though in this particular case I have shown the rims 76 made out of sheet metal to obtain a lighter construction. The wheel felly 2 is likewise indicated in Fig. 15. In Fig. 16 I have indicated how for instance a solid iron tire 77 may be attached to the felly 2 for instance by means of bolts 78. In Fig. 17 I have shown how the felly 2 itself may serve as the tire by having its outer face strengthened and flanged as shown at 79.

In all cases where the tire is independent of the felly 2 and held by suitable means, for instance by rims, to the felly, in particular in case of rubber tires, I find it preferable to provide an expansion device on the felly which permits the felly to contract and thereby lessen its diameter in order to permit the easy sliding on and off of the rubber tire which is usually of slightly smaller diameter when it is new, because tires of this kind are likely to increase in size when used.

The expansion device which I prefer to employ is shown in its location on the wheel rim in Fig. 1 at 60, and its detail construction is shown in Figs. 12, 13 and 14. In these latter figures it clearly appears that the felly 2 is split where the expansion device is located so that the two ends of the felly facing each other are beveled toward each other whereby two V-shaped notches 61 are produced on both sides of the felly into which wedges 62 and 63 respectively are fitted. These wedges when the felly is fully expanded to its normal size by inserting the wedges into their seats substantially meet at their inner ends, so that both wedges are flush with the sides of the felly as shown. Wedges 62 and 63 are provided on the side facing the center of the wheel with bosses 64 and 65 which are in line with each other. Boss 64 is threaded to receive a screw 66 while boss 65 is merely bored out to permit the sliding of screw 66 through it. However, at the outer end the boring of boss 65 is large enough to receive the shoulder 67 of screw 66 so that when this screw is turned in the boss 64 the two wedges are drawn toward each other thereby and the ring is expanded. The wedges are provided with ears 68 and 69 respectively, which are provided laterally of the bosses and which lie against the inside of the felly as shown in Figs. 12 and 14, and these ears of the two wedges meet when the wedges are drawn tightly toward each other so as to supplement each other to a substantially oval flange. On the line on which they meet bolts 70 are provided in felly 2 each of which clamps a washer 71 tightly over two adjoining ears 68 and 69, so that I am enabled after the wedges are drawn together and the rim is expanded, to lock the two wedges together by tightening the washers 71 over their respective ears by means of screws 70. It will be clear for instance from Fig. 14 that each wedge is fitted into the V-shaped slot formed by the two felly ends in dovetailed fashion, whereby the outer faces of the wedges are flush with the circumference of the felly. By this arrangement I am enabled to easily permit the contraction of the felly by loosening the wedges to attach the tire and thereafter to easily expand the felly again to its normal size by only tightening one screw 66 and then tightening the locking screws 70.

The action of the wheel when under load is as follows: The hub 1 under the load of the vehicle tends to sag down and thus move out of the center of the felly. The effect of this is a downward movement of all the pivot pins 6 so that all the arms 5 which are pivotally attached to these pins transmit this downward movement the more the nearer their longitudinal axes are located in line with the downward thrust. This in turn will, according to whether the arms in Fig. 1 for instance are located on the right hand or left hand side of the vertical diameter of the hub, rock the rockers 9 in one or in the other position, and by their rocking springs 13 are put under tension. Some of the arms 5 it will be noted will of course transmit hardly any motion to the rocker arms, for instance the arm 5 whose pivot pin 6 is located in the lower portion of the hub to the right of the vertical diameter in Fig. 1, and likewise the arm 5, whose pivot 6 is located diametrically opposite to the one just referred to. Drawing a diameter through the two pivot pins 6 just referred to it will be noted from Fig. 1 that all the arms 5 attached to the pivot pins 6 located to the right of this diameter tend to move their rocker arms 9 clockwise; all the arms 5 whose pivot pins 6 are located to the left of this diameter tend to move their rocker arms 9 counterclockwise.

What I claim is:

1. In a spring wheel of the character described, the combination with the felly and the hub, of a plurality of springs circumferentially disposed between the hub and the felly, rocker members pivotally attached to said felly intermediate their ends and pivotally connected at their ends to said springs, and arms pivotally connected to said hub and to one end of said rockers.

2. In a spring wheel of the character described, the combination with the felly and the hub, of a plurality of springs circumferentially disposed between the hub and the felly, rocker members pivotally attached to said felly intermediate their ends and pivotally connected at their ends to said springs, and arms pivotally connected to said hub and to one end of said rockers, said arms running substantially tangentially to said hub.

3. In a spring wheel of the character described, the combination with the felly and the hub, of a plurality of springs circumferentially disposed between the hub and the felly, rocker members pivotally attached to said felly intermediate their ends and pivotally connected at their ends to said springs, and arms pivotally connected to said hub and to one end of said rockers, said arms running substantially tangentially to said hub, and said felly having U-shaped cross section opening inwardly, said rockers being pivotally disposed between the lateral flanges of said felly.

4. In a spring wheel of the character described, the combination with the felly and the hub, of a plurality of rocker members pivotally disposed in said felly and having springs connecting their free ends with the free ends of the adjacent members, and arms pivotally attached to the hub and to one of the ends of said rockers, said arms running substantially tangentially to said hub.

5. In a spring wheel of the character described, the combination with the felly and the hub, of a plurality of rocker members pivotally disposed in said felly and having springs connecting their free ends with the free ends of the adjacent members, and arms pivotally attached to the hub and to one of the ends of said rockers, said arms running substantially tangentially to said hub, and said felly having U-shaped cross section opening inwardly, said rockers being pivotally disposed between the lateral flanges of said felly.

6. In a spring wheel of the character described, the combination with the felly and the hub, rocker members pivotally attached to the felly, and having springs connecting their free ends with the free ends of the adjacent members and arms pivotally attached to the hub and to one of the ends of said rockers; of a lubricating device located in the hub and having means for storing lubricant in the walls of the hub, and adapted to intermittently discharge such lubricant to all of said pivotal connections of said arms and rocker members when the wheel rotates, but to intercept such supply when the wheel ceases to rotate.

7. In a spring wheel of the character described, the combination with the felly and the hub, rocker members pivotally attached to the felly and having springs, connecting their free ends with the free ends of the adjacent members, and arms pivotally attached to the hub and to one of the ends of said rockers; of a lubricating device located in the hub consisting of a suitable number of oil wells disposed in the hub body and adapted to eject lubricant by centrifugal force when the wheel rotates, a controller permitting the escape of lubricant from said wells intermittently when the wheel rotates, and means for conducting said lubricant from said controller to said pivotal connections.

8. In a spring wheel of the character described, the combination with the felly and the hub having flanges at both ends, rocker members pivotally attached to the felly and having springs connecting their free ends with the free ends of the adjacent members, and arms pivotally attached to the hub and to one of the ends of said rockers; of a lubricating device located in the hub consisting of a suitable number of oil wells disposed in the hub body and adapted to eject lubricant by centrifugal force when the wheel rotates, a controller permitting the escape of lubricant from said wells intermittently when the wheel rotates, said controller consisting of a rocking shaft disposed between the hub flanges and having a cone splined to each end and seated in said flanges by a spring interposed between said cones, the face of each flange having a circular groove connecting the oil wells located in the hub, said faces also having a main channel leading from said groove to the cone in said flange, each flange face also having a spiral channel starting from the cone and leading past all of said pivotal connections of said arms and having branch channels leading from said spiral channel into said pivotal connections, said cone adapted to intermittently connect said main channel with said spiral channel when said shaft is rocked from normal position to permit intermittent passage of lubricant to said pivotal connections, and means disposed adjacent to the wheel for rocking said shaft when the wheel rotates, and a face plate covering each of said flange faces.

9. In a spring wheel of the character described, the combination with the felly and the hub having flanges at both ends, rocker members pivotally attached to the felly and having springs connecting their free ends with the free ends of the adjacent members, and arms pivotally attached to the hub and to one of the ends of said rockers; of a lubricating device located in the hub consisting of a suitable number of oil wells disposed in the hub body and adapted to eject lubricant by centrifugal force when the wheel rotates, a controller permitting the escape of lubricant from said wells intermittently when the wheel rotates, said controller consisting of a rocking shaft disposed between the hub flanges and having a cone splined to each end and seated in said flanges by a spring interposed between said cones, the face of each flange having a circular groove connecting the oil wells located in the hub, said faces also having a main channel leading from said groove to the cone in said flange, each flange face also having a spiral channel starting from the cone and leading past all of said pivotal connections of said arms and having the branch channel leading from said spiral channel into said pivotal connections, said cone adapted to intermittently connect said main channel with said spiral channel when said shaft is rocked from normal position to permit intermittent passage of lubricant to said pivotal connections, a double-faced latch fastened to one end of said shaft, a spring for holding said shaft and latch in normal position, and a pin fixed adjacent to the hub in coöperative relation with said latch for lifting said latch against the tension of its spring to rock the shaft when the hub rotates in either direction.

10. In a spring wheel of the character described, the combination with the felly and the hub having flanges at both ends, rocker members pivotally attached to the felly and having springs connecting their free ends with the free ends of the adjacent members, and arms pivotally attached to the hub and to one of the ends of said rockers; of a lubricating device located in the hub consisting of a suitable number of oil wells disposed in the hub body and adapted to eject lubricant by centrifugal force when the wheel rotates, a controller permitting the escape of lubricant from said wells intermittently when the wheel rotates, said controller consisting of a rocking shaft disposed between the hub flanges and having a cone splined to each end and seated in said flanges by a spring interposed between said cones, the face of each flange having a circular groove connecting the oil wells located in the hub, said faces also having a main channel leading from said groove to the cone in said flange, each flange face also having a spiral channel starting from the cone and leading past all of said pivotal connections of said arms and having branch channels leading from said spiral channel into said pivotal connections, said cone adapted to intermittently connect said main channel with said spiral channel when said shaft is rocked from normal position to permit intermittent passage of lubricant to said pivotal connections, and means disposed adjacent to the wheel for rocking said shaft when the wheel rotates, and a face plate covering each of said flange faces, each of said arms having ducts and channels for conducting the lubricant from its pivotal connection with the hub to the remaining pivotal connections of said arm and the rocker connected to it.

11. In a spring wheel of the character described, the combination with the felly and the hub having flanges at both ends, rocker members pivotally attached to the felly and having springs connecting their free ends with the free ends of the adjacent members, and arms pivotally attached to the hub and to one of the ends of said rockers; of a lubricating device located in the hub consisting of a suitable number of oil wells disposed in the hub body and adapted to eject lubricant by centrifugal force when the wheel rotates, a controller permitting the escape of lubricant from said wells intermittently when the wheel rotates, said controller consisting of a rocking shaft disposed between the hub flanges and having a cone splined to each end and seated in said flanges by a spring interposed between said cones, the face of each flange having a circular groove connecting the oil wells located in the hub, said faces also having a main channel leading from said groove to the cone in said flange, each flange face also having a spiral channel starting from the cone and leading past all of said pivotal connections of said arms and having branch channels leading from said spiral channel into said pivotal connections, said cones having a flattened portion on their surfaces adjacent to said main and spiral channels permitting said cones to intermittently connect said two channels when said shaft is rocked from normal position to permit intermittent passage of lubricant to said pivotal connections, and means disposed adjacent to the wheel for rocking said shaft when the wheel rotates, and a face plate covering each of said flange faces.

12. In a spring wheel of the character described, having a transversely split felly and a tire adapted to be attached thereto, an expansion device permitting the contraction and expansion of the felly, consisting of two wedges disposed between the split felly portion one from either side of the felly in dovetailed fashion and a screw threaded into one of said wedges and shouldered against the other wedge for moving said wedges toward and away from each other, to cause expansion and permit contraction respectively of said felly, each of said wedges having an ear on each side of said expansion screw, and a screw bolt on each side of said screw fastened in the felly and adapted to clamp the wedge ears of both wedges to the felly after the wedges have been tightened toward each other.

JOHN A. HAGERSTROM.

Witnesses:
H. ALFRED JANKE,
M. G. CRAWFORD.

Copies of this patent may be obtained for five cents each, by addressing the "Commissioner of Patents, Washington, D. C."